Sept. 29, 1970         A. ELICH         3,530,532
HEAD AND VISCERA REMOVER
Filed March 11, 1968         3 Sheets-Sheet 1
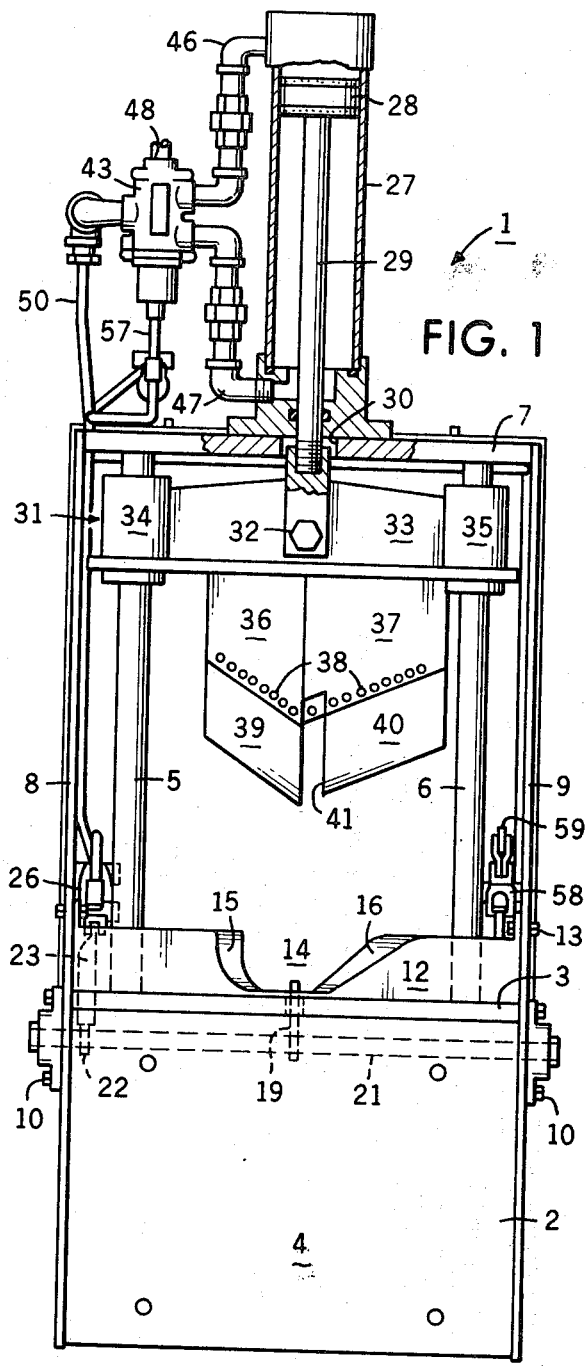
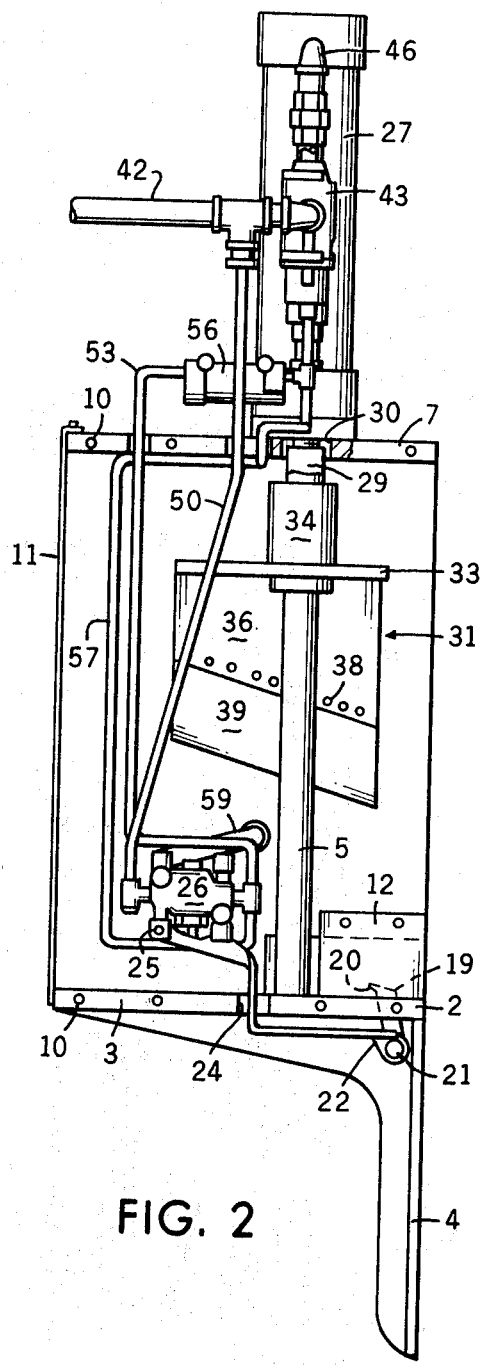
FIG. 1
FIG. 2
INVENTOR
ANTON ELICH
BY
*Lawrence J. Hurst*

Sept. 29, 1970  A. ELICH  3,530,532
HEAD AND VISCERA REMOVER
Filed March 11, 1968  3 Sheets-Sheet 2
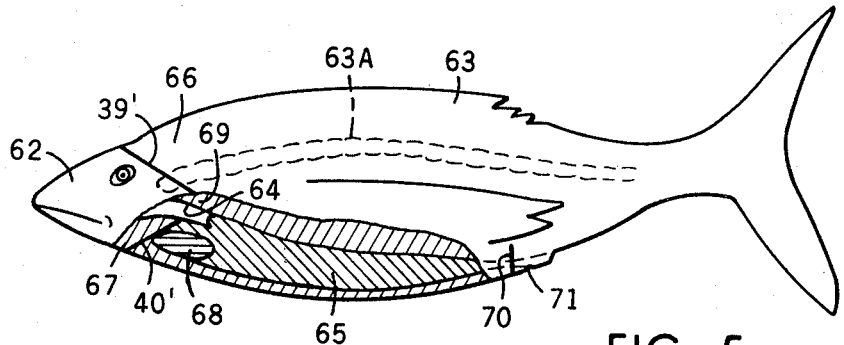
FIG. 5
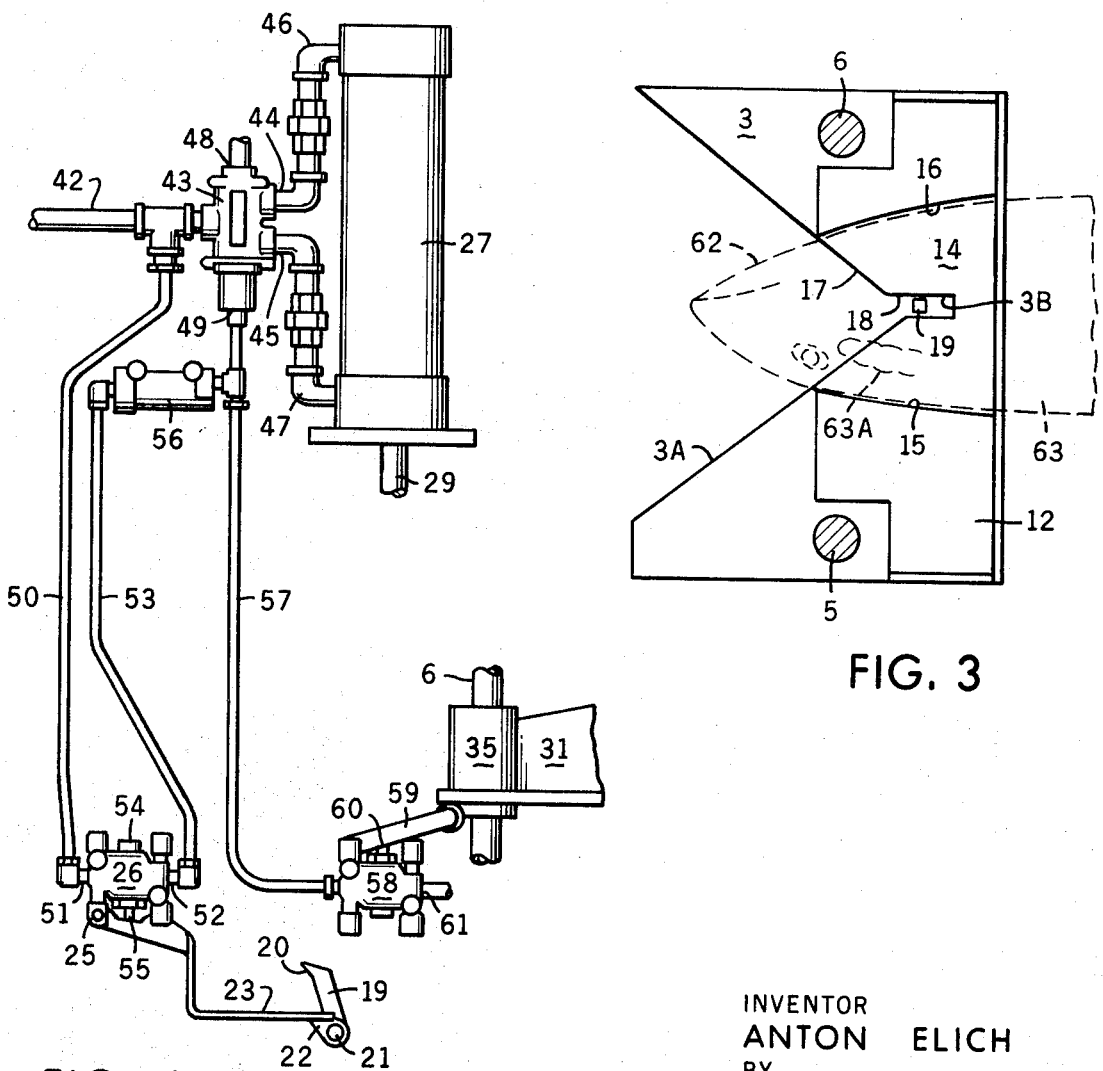
FIG. 4
FIG. 3
INVENTOR
ANTON ELICH
BY
Lawrence J. Hurst United States Patent Office 3,530,532
Patented Sept. 29, 1970

3,530,532
HEAD AND VISCERA REMOVER
Anton Elich, Rolling Hill, Calif., assignor to The Ralston Purina Company, St. Louis, Mo., a corporation of Missouri
Filed Mar. 11, 1968, Ser. No. 712,027
Int. Cl. A22c 25/14
U.S. Cl. 17—60       8 Claims

ABSTRACT OF THE DISCLOSURE

A machine for removing the head and viscera of a fish is provided with a frame having a guillotine blade thereon. An actuation mechanism effects the positive displacement of the guillotine blade such that the head of the fish is severed from the body thereof. The guillotine blade is provided with a notch in the intermediate portion thereof, such that when it severs the head from the body portion of the fish, the esophagus is not severed, but serves as a connecting link between the head and viscera in the body portion. Therefore, the head and viscera may be removed from the body portion of the fish in a single operation.

BACKGROUND OF THE INVENTION

This invention relates to improvements in the eviscerating of fish and, more particularly, to a machine for removing the head and viscera of the fish at the same time.

In the past, machines for removing the head and viscera of fish have been provided with means which cut into the fish at predetermined points as they were moved by conveyors on these machines. These machines have the undesirable or disadvantageous feature of having saws predeterminately positioned with respect to the path of movement of the conveyors such that various sized fish could not be accommodated by these machines. This required the presizing of fish such that the cuts made by the prepositioned saws were approximately in the proper position or required the saws to be adjustable, so that the cuts in the fish could be made at the proper positions. Either of these methods of accommodating various sized fish proved to be a burden and uneconomical in the everyday operation of fish butchering.

As a result of this, the most common method utilized in the butchering of fish consists of conveying the fish along a conveyor with men carrying out the butchering thereof. As the fish are moved along the conveyor, the butcher would make a cut with a regular knife, starting at the vent or anal opening, extending along the length of the stomach, and terminating at the gill cover. The viscera would be removed from the fish but the head would be allowed to remain on the body of the fish during the precooking thereof. The head of the fish is then removed by hand at the cleaning table. This is not only undesirable due to the unsanitary nature of having the head removed at the cleaning table and the loss of space in the cooker during the precooking operation but is also undesirable because of the necessity of having two operations to remove the head and viscera of a fish.

SUMMARY

It is therefore, a general object of the present invention to provide a machine for removing the head and viscera from a fish in a single operation which is capable of accommodating various sized fish.

Another object of the present invention is to provide a machine for removing the head and viscera from a fish in a single operation which severs the pharyngeal muscle or tissue area and which substantially insures that all of the viscera will be removed from the body portion with the head.

Another object of the present invention is to provide a machine having a blade for severing the head from the body of a fish and said blade being provided with means permitting the esophagus of the fish to remain unsevered and act as the connecting link between the viscera and head of the fish for the substantially simultaneous removal thereof from the body of the fish.

Still another object of the present invention is to provide a machine for removing the head and viscera from a fish which may be adapted to include means which position various sized fish under the cutting means in relation to the gill of the fish for severing the head from the body of the fish in a uniform manner.

These and other objects and advantages of the present invention will become apparent hereinafter.

Briefly, the present invention comprises a machine for removing the head and viscera of a fish having cutting means thereon movable between an operative and an inoperative position, said cutting means being adapted to sever the head from the body of the fish while maintaining the viscera connected to the head, said cutting means being movable in response to an applied force toward its operative position severing the head from the body of the fish, and thereafter said cutting means being movable to its inoperative position whereby the head and viscera of the fish are removed from the body thereof.

BRIEF DESCRIPTION OF THE DRAWINGS

In the accompanying drawings which form a part of this specification and wherein like numerals refer to like parts wherever they occur:

FIG. 1 is a diagrammatic front view of a machine for removing the head and viscera of a fish, FIG. 2 is a diagrammatic side view of the machine of FIG. 1, FIG. 3 is a diagrammatic top view of the fish head receiving member of the machine of FIGS. 1 and 2, showing the positioning of the fish head therein, FIG. 4 is a diagrammatic view of the fluid pressure system of the machine of FIGS. 1 and 2, FIG. 5 is a sectional view showing a fish in cross section which illustrates the direction and number of cuts to be made by the machine of FIGS. 1 and 2.

DESCRIPTION OF THE PREFERRED EMBODIMENTS

Figure 6:
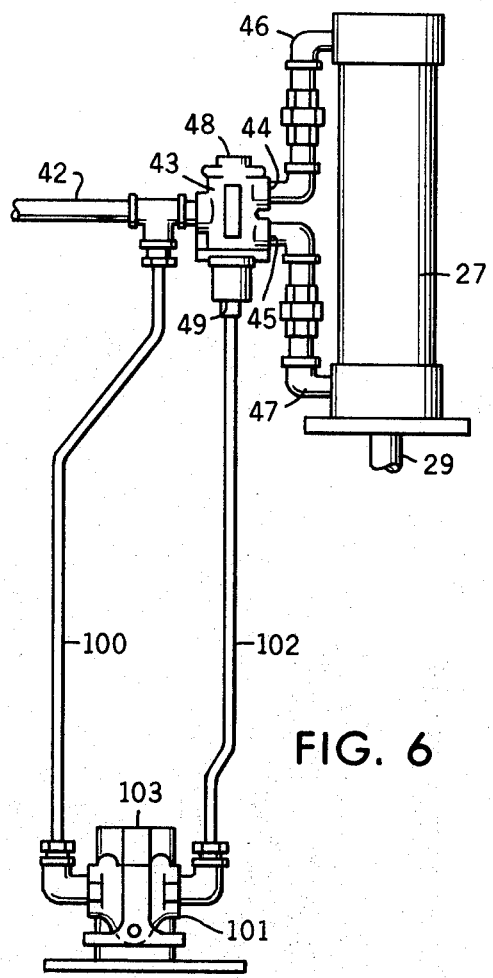
FIG. 6 is a diagrammatic view showing another fluid pressure system which may be utilized on the machine of FIGS. 1 and 2.

Referring now to FIGS. 1, 2, and 3, the head and viscera machine indicated generally at 1 is provided with a base member 2 having a horizontally extending table portion 3 and a vertically extending mounting portion 4 connected to said table portion. The mounting portion 4 is adapted for suitable attachment to the side of a bench or table (not shown) so that the table portion 3 is level with the top of the bench or table. As best seen in FIG. 3, the base plate 3 is provided with a tapered or V-shaped opening 3A which extends from the rear toward the front thereof and said V-shaped opening terminates at a slot 3B approximately at the apex of said opening. The significance of the tapered opening 3A and slot 3B configuration in the base plate 3 will later be explained in detail. A pair of guide posts 5 and 6 have one end thereof mounted on the table portion 3 of base member 2 by suitable means, such as a press fit, and the other ends thereof are attached to an upper plate 7 by a press fit. A pair of side plates 8, 9 are provided adjacent to the guide posts 5, 6 and are connected to the upper and lower plates 7, 3 by suitable means such as studs 10, to form an integral rigid frame unit. A shield or splash guard 11 is connected to the upper plate 7 and extends across the opening between the side plates 8 and 9 at the back end of the machine 1.

A fish head receiving base member 12 is positioned on the table portion 3 and is fixedly attached in position by connection to the side plates 8 and 8 by means of bolts 13. The head receiving member 12 is provided with an opening 14 for receiving the head of a fish and this opening substantially conforms to the configuration of a fish head. The opening 14 is provided with an abruptly tapered wall section 15 which is adapted to receive the head portion of the fish adjacent to the eyes thereof and the opposite side of the opening 14 is provided with a gradually tapering wall portion 16 which is adapted to receive the belly or stomach portion of the fish. It should be noted that the wall portions 15 and 16 not only are tapered in the vertical direction to conform to the shape of a fish head but said wall portions are also tapered such that the opening 14 diminishes in size toward the rear of the machine (as best seen in FIG. 3). Thus the opening 14 closely approximates the shape of the head of a fish which permits easy positioning of fish in said opening and aids in the spotting or entering of the fish for the butchering thereof. As best viewed in FIG. 3, the head receiving member 12 is also provided with a tapered or V-shaped opening 17 intermediate the opening 14 and the V-shaped opening 17 substantially conforms to the V-shaped opening 3A provided in the base plate 3. In addition the V-shaped opening 17 terminates in a slot 18 provided in the head receiving member 12 approximately at the apex of said V-shaped opening. It should be noted that the slot 18 and slot 3B are in registry for a purpose to be described hereinafter.

A hooked arm or trigger actuating member 19 extends through the slots 3B and 18 to position slightly extending into the opening 14 and said trigger member is adapted for engagement with the gill of a fish inserted between the fish receiving wall portions 15 and 16 of the head receiving member 12.

The end of the trigger member 19 extending into the opening 14 is provided with a slightly inclined hooked end 20 which will permit the gill portion of the fish to slide over it but which will catch in the gills as the fish is pulled in the opposite direction. The opposite end of the trigger member 19 is connected to a shaft 21 which is journaled in the side plates 8 and 9 beneath the table portion 3. A cam member 22 is mounted on the shaft 21 adjacent to the leftward end thereof and said cam is in engagement with one end of a mechanical link element 23 extending through an aperture 24 in the table portion 3. The other end of the mechanical link element 32 is pinned at 25 to a 3-way application valve indicated generally at 26. It should be understood that shaft 21 is capable of limited rotary movement such that the cam 22 may be moved to actuate the link 23 and 3-way valve 26.

An air cylinder indicated generally at 27 is secured on top of the upper plate 7. The cylinder 27 is provided with a positive displacement piston 28 and a push rod 29 connected to said piston extends through an aperture 30 in the plate 7. The free end of the push rod 29 is connected to a guillotine blade assembly indicated generally at 31, by suitable means such as bolt 32.

The guillotine blade assembly 31 includes a frame 33 having opposed bushings 34, 35 therein which are adapted for sliding engagement on the guide posts 5 and 6, respectively. A pair of plates 36 and 37 are connected to the lower side of the frame 33 such that they form a V-shape substantially conforming to the V-shape openings 17 and 3A. Each of the plates 36 and 37 are provided with screws 38 for attaching or affixing thereto a blade or cutting member 39 and 40, respectively. It should be noted that the cutting element 40 is shorter than its mounting plate 37 and is mounted such that the cutting elements 39 and 40 do not meet to form a continuous V-shaped cutting surface. Thus, the cutting elements 39 and 40 define a V-shaped cutting surface having a notch or slot 41 adjacent to the apex or middle portion thereof. Also, it should be noted that not only do the cutting elements 39 and 40 define a V-shape but as viewed in FIG. 2, the blade portions taper upwardly from the apex formed thereby. Thus, the apex of the cutting elements 39 and 40 serves to pierce the flesh of the fish in a continuous stroke when the air cylinder 27 is charged with air, and the piston 28, push rod 29 and guillotine blade assembly 31 are urged downwardly toward their operative position to effect the cutting operation. It has been found that an included angle of 60° for the V-shaped blades gives the most desirable results as far as meat yields but it is possible to use blades at any desired included angle.

Referring no wto FIG. 4, the fluid pressure system for the machine shown in FIGS. 1, 2 and 3 is provided with a supply or inlet conduit 42 which connects a fluid pressure source (not shown) with a commercially available pilot operated 4-way control valve indicated generally at 43. The control valve 43 is provided with a pair of outlet ports 44, 45 having conduits 46, 47 therein which connect with the upper and lower portions of the double acting air cylinder 27, respectively. The valve 43 normally establishes pressure fluid communication between the inlet conduit 42 and the conduit 47 such that the piston 28 in the cylinder 27 is normally maintained in its upward position. In addition, an exhaust port 48 provided in the control valve 43 is normally in pressure fluid communication with the outlet port 44 and conduit 46 such that the upper chamber of the cylinder 27 is normally exhausted to atmosphere. The plunger mechanism of the control valve 43 is responsive to fluid pressure supplied to the inlet port 49 (from a source to be described hereinafter) such that it is possible to connect the supply conduit 42 with the conduit 46 while simultaneously establishing pressure fluid communication between the conduit 47 and the exhaust port 48. By simultaneously effecting the aforesaid pressure fluid communication, pressure fluid is supplied to the upper cavity while the pressure fluid in the lower cavity is exhausted which serves to urge the piston 28 downwardly in the cylinder 27.

Another conduit indicated generally at 50 intersects the supply conduit 42 adjacent to the inlet to the control valve 43 The conduit 50 is connected to the inlet port 51 of the commercially available 3-way cam actuated lever valve 26. The valve 26 is provided with an outlet port 52 connected to a conduit 53 and is also provided with an exhaust port 54 which is in normal pressure fluid communication with the outlet port 52. The plunger 55 is actuated by the lever 23 is provided in a position normally preventing pressure fluid flow from the inlet port 51 to the outlet port 52. On the actuation of the plunger 55 the exhaust port 54 is closed and pressure fluid communication is established between the inlet and outlet ports 51 and 52 such that the conduit 53 may be charged with pressure fluid.

The conduit 53 is connected to one end of a cutout or flow check valve 56 and the other end of said flow check valve is connected to a control conduit 57. The conduit 57 has one end thereof connected to the inlet port 49 of the control valve 43 and the other end thereof is connected to a two-way cam actuated lever valve indicated generally at 58.

The valve 58 is mounted on the side of the machine 1 and has a lever 59 thereon adapted for engagement by the frame 33 of the cutting assembly 31. The plunger 60 of the valve 58 is normally in a position preventing pressure fluid communication between the conduit 57 and the exhaust port 61 of said valve. The plunger 60 is actuated by the lever 59 which serves to establish pressure fluid communication between conduit 57 and exhaust port 61 to exhaust the pressure fluid from the system when the cutting assembly 31 has made its cutting stroke and engaged the lever 59.

Referring now to FIG. 5 a fish is shown in cross-section to illustrate the area which will be cut by the guillotine cutting elements 39 and 40 in relation to the vital organs of the fish. The fish includes a head portion 62 and a body portion 63. The esophagus 64 serves as a connecting link between the head portion 62 and the viscera indicated generally at 65 in the body portion 63. The cuts made by the cutting elements of the guillotine blade 39 and 40 will cut into the fish along the lines indicated generally at 39' and 40'. The cut 39' is made in the posterior direction of the fish and severs the backbone 63A of the fish so that the head 62 may be freed from the body 63. The cut 39' is also positioned so that when the head 62 is removed from the body 63 the meaty portion of the fish or horn area 66 will be retained with the body to increase the yeld of usable meat recovered from the fish. The cut 40' cuts into the fish in a posterior direction through the isthmus 67 and the heart 68. The esophagus 64 is not severed by either of the cuts 39' or 40,' but instead passed through notch 41 to remain in an unsevered condition and thereby act as a connecting link between the head and severed viscera. Thus, a small portion of the skin and pharyngeal muscle 69 is the only tissue between the head and body portions 62 and 63 which is not severed by the cutting action of the cutting elements 39 and 40. However, this skin and muscle area 69 is severed or broken due to the downward thrust of the cutting elements 39 and 40 and, therefore, the head and viscera are freely removable from the body of the fish. It should be noted that it may be desirable to make a small cut 70 in the fish in the anal or vent area 71 either manually or by mechanical means. The cut 70 serves to free the viscera 65 from the connective tissue in this area so that the viscera 65 may be readily removed from the body 63. By making the cut 70 to free the viscera 65 from the body 63, it is possible to insure that viscera will be removed therefrom without breaking and therefore a clean fish carcass will be obtained.

In the operation of the machine 1, a fish which is to have its head and viscera removed therefrom is inserted into the opening 14 of the head receiving block 12. The tapered walls 15 and 16 of the opening 14 provide for the easy placement of the fish head under the guillotine blade assembly 31. As the fish is pushed into the opening 14, the lever or trigger member 19 is depressed, which allows that head of the fish to slide over said trigger member. After the head of the fish has been pushed into the opening 14 sufficiently far enough so that the gills of the fish have passed the trigger 19, the fish is pulled in the opposite direction or toward the front of the machine 1. As the fish is pulled toward the front of the machine 1, the hooked end 20 of the trigger 19 engages or catches in the gill of the fish and thereafter, as said fish is pulled forward, the trigger 19 rotates the shaft 21 in a clockwise direction, which serves to actuate the guillotine blade assembly 31 in the following manner. The rotation of the trigger 19 and shaft 21 serves to move the cam 22 and lever 23, which drives the plunger 55 to a position energizing the valve 26 and establishing pressure fluid flow from the inlet conduit 50 to the conduit 53. The pressure fluid flows from the conduit 53 through the cutout valve 56 and into the inlet port 49 of the control valve 43. It should be noted that cutout or flow check valve 56 only allows a predetermined amount of pressure fluid to flow therethrough and thereafter prevents pressure fluid flow in either direction through the valve. The fluid pressure at the inlet port 49 of the control valve 43 serves to move the plunger mechanism therein (not shown) to a position establishing pressure fluid communication between the supply conduit 42 and the conduit 46 connected to the upper end of the air cylinder 27, while simultaneously establishing pressure fluid communication between the conduit 47 connected to the lower end of the air cylinder 27 and the exhaust port 48 of said control valve. Therefore, the air cylinder 27 is activated, serving to urge piston 28 and guillotine blade assembly 31 downwardly to their operative positions and the cutting members 39 and 40 effect the cuts 39' and 40', as indicated in FIG. 5. As previously described, the cuts 39' and 40' do not sever the esophagus 64 since this area of the fish is received in the groove or notch 41 of the cutting means 39, 40. However, it should be noted that this gill plate or muscle area 69 is severed due to the pulling or stretching of this area when the cutting element 39, 40 engages the fish. Thus, the head of the fish is free to fall from the body thereof after the cuts 39' and 40' have been made by the guillotine blade assembly 31 being moved to its operative position. In addition to the guillotine blade assembly 31 effecting the severance of the head from the body of the fish, the frame 33 engages the lever 59 to move the plunger 60 in the valve 58 to a position connecting the conduit 57 with the exhaust port 61 of said valve. This serves to exhaust the pressure fluid from the inlet port 49 acting on the plunger mechanism of the control valve 43, such that pressure fluid communication between the supply conduit 42 and the conduit 47 connected to the lower end of the cylinder 27 is established while the pressure fluid in the upper end of the cylinder 27 and conduit 46 is exhausted through the port 48. Therefore, the air cylinder 27 is deactivated or de-energized and the piston 28 and guillotine blade assembly 31 and positively moved upwardly to their inoperative position. Also, as the head of the fish falls from the body, the lever or trigger 19 is returned to its normal position, permitting the plunger 55 to be moved to a position preventing pressure fluid flow from the conduit 50 therethrough while connecting the conduit 53 with the exhaust port 54.

After the cutting operation, the force of gravity causes the head of the fish to fall from the body and the head drops into the tapered of V-shaped openings 3A and 17. Due to the taper or V-shape of the openings 3A and 17, the head is readily received therein and when the body portion is pulled toward the front of the machine, the head is grippingly engaged or caught by the tapering sides of the openings. Thereafter, as the body is pulled forward, the esophagus serves as a connecting link between the head and viscera such that the viscera is pulled from the body. It is of course obvious that the viscera may be more readily and easily removed from the body of the fish if a small cut is made, either by hand or mechanically, in the fish in the anal area to free the viscera from the connective tissue in this area. After the viscera is free from the body portion of the fish, the head and viscera connected thereto drop from the openings 3A and 17, due to the force of gravity.

Referring now to FIG. 6, an alternative or another possible embodiment of the present invention is illustrated. To simplify the fluid pressure system arrangement and for economy of preparing such a head and viscera machine, it is possible to utilize a manualy operated application or actuation cylinder rather than the automatic trip mechanism as described in connection with FIG. 4. Accordingly, it is possible to have a supply conduit 100 intersect the air supply line 42 adjacent to the inlet port of the control valve 43. The supply line 100 will then be connected to the inlet port of a manually operated application valve which in this particular illustration is a three-way foot operated valve 101. The outlet port of the foot operated valve 101 is connected to the inlet port 49 of the control valve 43 by another conduit 102. Thus, when it is desired to energize the air cylinder 27 and move the guillotine blade assembly 31 from its inoperative to its operative position, a manual force is applied to the foot valve 101. The valve 101 is then activated which establishes pressure fluid communication between the supply conduit 100 and the conduit 102 to energize the control valve 43 and charge the control valve 27 as previously described, affecting the movement of the guillotine blade assembly 31. When the cutting operation is complete, the foot valve 101 is deactivated and thereby closes the inlet port connected to the supply conduit 100 and establishes pressure fluid communication between the conduit 102 and the exhaust port 103, which enables the piston 28 in the air cylinder 27 and the guillotine blade assembly 31 connected thereto to return to its inoperative position as previously described. Thus, it is possible to operate the head and viscera machine in response to a manually applied force or in response to an applied force to the automatic trip mechanism as described in connection wtih FIG. 4.

From the foregoing, it is now apparent that a novel machine, for removing the head and viscera from a fish, meeting the objectives set out hereinbefore provided and that changes or modfiications as to the precise confifurations, shapes and details of the construction set forth in the disclosure by way of illustration may be made by those skilled in the art without departing from the spirit of the invention, as defined by the claims as follows:

The embodiments of the invention in which an exclusive property or privilege is claimed are defined as follows:

1. Apparatus for removing the head and viscera of a fish comprising a frame, a V-shaped blade on said frame moveable between an inoperative and operative position, actuation means on said frame engageable by the fish, said actuation means being activated in response to the engagement thereby of the fish, driving means on said frame connected to said blade and said actuation means, said driving means being responsive to the activation of said actuating means to control the movement of said blade, a notch in said V-shaped blade adapted to receive the esophagus of the fish as said V-shaped blade is moved toward its opetative position whereby said blade may sever the head from the body of the fish while the esophagus is received in said notch to remain in an unsevered condition and to serve as the connecting link between the head and viscera of the fish, and said V-shaped blade being movable toward its inoperative position permitting the head and viscera connected thereto to be removed from the body of the fish.

2. The apparatus according to claim 1 wherein said V-shaped blade defines an included angle of 60°.

3. Apparatus for removing the head and viscera of a fish comprising a frame, blade means on said frame movable between the inoperative and operative position, actuation means on said frame engageable by the fish, said actuation means being activated in response to the engagement thereby of the fish, a fluid pressure responsive motor on said frame connected to said blade means and said actuation means, a source of pressure fluid connected to said fluid pressure responsive motor, said actuation means controlling the flow of pressure fluid from said source to said fluid pressure responsive motor, said actuation means normally being in a position preventing pressure fluid flow to said fluid pressure responsive motor to maintain said blade means in its inoperative position, said actuaton means being movable in response to the engagement by the fish to effect the application of pressure fluid to said fluid pressure responsive motor to urge said blade means toward its operative position to cut the fish between the head and body thereof without severing the esophagus, the unsevered esophagus serving as a connecting link between the head and viscera of the fish, and thereafter said blade means being movable toward its inoperative position permitting the head and viscera connected thereto to be removed from the body of the fish.

4. The apparatus according to claim 3 wherein said frame includes a base plate for receiving the head of the fish and having an aperture therein, and said actuation means includes a shaft rotatably mounted on said frame, an arm on said shaft extending into said aperture and adapted for insertion into the gill area of the fish and cam means on said shaft for effecting the application of pressure fluid to said fluid pressure responsive motor, said arm being movable in response to engagement by the fish to rotate said shaft and cam means to a position establishing pressure fluid flow from said source to said fluid pressure responsive motor.

5. Apparatus for removing the head and viscera of a fish comprising a frame, blade means on said frame movable between an inoperative and operative position, actuation means on said frame engageable by the fish, said actuation means being activated in response to the engagement thereby of a fish, an air cylinder connected to said frame and having a positive displacement push rod therein, said push rod being connected to said blade means, said actuating means upon the actuation thereof being effective to supply air to said cylinder to move said push rod and said blade means from the inoperative to the operative position for cutting the fish between the head and body thereof without severing the esophagus, the unsevered esophagus serving as a connecting link between the head and viscera of the fish and thereafter said blade means being movable toward its inoperative position permitting the head and viscera connected thereto to be removed from the body of the fish.

6. Apparatus for removing the head and viscera of a fish comprising a frame, an opening in said frame having tapered sides, cutting means on said frame movable between an inoperative and operative position, said cutting means including a notch therein for receiving the esophagas of the fish, said cuuting means being movable in response to an applied force toward its operative position for cutting the fish between the head and body thereof without severing the esophagus, the esophagus being received in said notch to remain unsevered and serve as a connecting link between the head and viscera of the fish, said tapered sides of said opening being adapted to engage the head of the fish as it falls from the body after the severance thereof, and thereafter said cutting means being movable toward its inoperative position whereby the engagement of the head by said tapered sides permits the removal of the head and viscera from the body of the fish as the body is moved away from said cutting means.

7. The apparatus according to claim 6 including actuation means connected to said cutting means controlling the movement of said cutting means between its inoperative and operative positions, said actuation means being activated in response to a manually applied force to urge said cutting means toward its operative position, and upon the release of the manually applied force said actuation means being deactivated to permit said cutting means to return to its inoperative position.

8. The apparatus according to claim 6 including actuation means on said frame engageable by the fish and connected to said cutting means for effecting the movement thereof, said actuation means being activated in response to the engagement thereby of the fish to effect the movement of said cutting means toward its operative position.

References Cited

UNITED STATES PATENTS

| 1,577,518 | 3/1926 | Chauveur | 17—60 |
| 1,599,807 | 9/1926 | Christiansen | 17—60 |

FOREIGN PATENTS

| 759,914 | 12/1933 | France. |
| 457,153 | 11/1936 | Great Britain. |

LUCIE H. LAUDENSLAGER, Primary Examiner